(12) United States Patent
Agarwal et al.

(10) Patent No.: US 11,532,308 B2
(45) Date of Patent: Dec. 20, 2022

(54) SPEECH-TO-TEXT SYSTEM

(71) Applicant: ROVI GUIDES, INC., San Jose, CA (US)

(72) Inventors: Sukanya Agarwal, Haryana (IN); Vikram Makam Gupta, Karnataka (IN)

(73) Assignee: ROVI GUIDES, INC., San Jose, CA (US)

( * ) Notice: Subject to any disclaimer, the term of this patent is extended or adjusted under 35 U.S.C. 154(b) by 416 days.

(21) Appl. No.: 16/865,736

(22) Filed: May 4, 2020

(65) Prior Publication Data

US 2021/0343290 A1    Nov. 4, 2021

(51) Int. Cl.
*G10L 15/22*    (2006.01)
*G10L 15/26*    (2006.01)

(52) U.S. Cl.
CPC .............. *G10L 15/26* (2013.01); *G10L 15/22* (2013.01)

(58) Field of Classification Search
CPC ......... G10L 15/08; G10L 15/22; G10L 15/26; G10L 15/32
See application file for complete search history.

(56) References Cited

U.S. PATENT DOCUMENTS

| | | | | |
|---|---|---|---|---|
| 8,447,285 B1 * | 5/2013 | Bladon | ................... | H04W 4/16 379/85 |
| 10,579,730 B1 * | 3/2020 | Cherepanov | ............ | G06F 3/167 |
| 2006/0003781 A1 | 1/2006 | Jin et al. | | |
| 2007/0106494 A1 * | 5/2007 | Detlef | ................... | G06F 40/232 704/235 |
| 2007/0124507 A1 | 5/2007 | Gurram et al. | | |
| 2007/0299664 A1 * | 12/2007 | Peters | ..................... | G06F 40/16 704/235 |
| 2008/0270133 A1 * | 10/2008 | Tian | ...................... | G10L 15/065 704/251 |
| 2012/0022865 A1 | 1/2012 | Milstein | | |
| 2012/0035925 A1 * | 2/2012 | Friend | ..................... | G06F 16/68 704/235 |
| 2012/0278071 A1 * | 11/2012 | Garland | ................. | H04M 11/10 704/235 |

(Continued)

FOREIGN PATENT DOCUMENTS

JP    2005503590 A * 2/2005

OTHER PUBLICATIONS

U.S. Appl. No. 16/865,755, filed May 4, 2020, Sukanya Agarwal.

*Primary Examiner* — Daniel C Washburn
*Assistant Examiner* — Oluwadamilola M Ogunbiyi
(74) *Attorney, Agent, or Firm* — Haley Guiliano LLP

(57) ABSTRACT

Systems and methods for processing speech transcription in a speech processing system are disclosed. A first transcription of a first utterance is received. In response to receiving an indication of an erroneous transcribed word in the first transcription, a control circuitry automatically activates an audio receiver for receiving a second utterance. In response to receiving the second utterance, an audio file of the second utterance and an indication of a location of the erroneous transcribed word within the first transcription is transmitted to a speech recognition system for a second transcription of the second utterance. Subsequently, the erroneous transcribed word in the first transcription is replaced with a transcribed word from the second transcription.

22 Claims, 8 Drawing Sheets

(56) References Cited

U.S. PATENT DOCUMENTS

| | | | |
|---|---|---|---|
| 2013/0066630 A1* | 3/2013 | Roe | G10L 15/26 704/235 |
| 2013/0158995 A1* | 6/2013 | Romriell | G06F 40/279 704/235 |
| 2013/0191125 A1* | 7/2013 | Suzuki | G10L 15/26 704/235 |
| 2013/0346076 A1* | 12/2013 | Stewart | G06F 3/167 704/235 |
| 2015/0066505 A1* | 3/2015 | Baker | G10L 15/08 704/235 |
| 2015/0106091 A1* | 4/2015 | Wetjen | G10L 15/26 704/235 |
| 2015/0371632 A1* | 12/2015 | Skobeltsyn | G10L 15/1815 704/251 |
| 2017/0206808 A1* | 7/2017 | Engelke | G09B 21/04 |
| 2017/0206888 A1* | 7/2017 | Engelke | H04W 4/12 |
| 2019/0385610 A1* | 12/2019 | Steelberg | G10L 25/90 |
| 2020/0027445 A1* | 1/2020 | Raghunathan | G10L 15/183 |
| 2020/0265829 A1* | 8/2020 | Liu | G10L 13/033 |
| 2021/0074277 A1* | 3/2021 | Lewis | G06F 3/013 |
| 2021/0343291 A1 | 11/2021 | Agarwal et al. | |

\* cited by examiner

SPEECH-TO-TEXT SYSTEM

BACKGROUND

The present disclosure relates to speech-to-text processing and, more particularly, to systems and methods related to speech-to-text processing techniques facilitating precise transcription.

SUMMARY

With the advent of speech-to-text accuracy improvements, electronic devices equipped with automated speech recognition features have gained prevalence among modern day electronic consumer products. Voice-assisted devices, such as the Amazon-manufactured Alexa and the Google-manufactured Google Home devices, are now commonplace in avid technology user households successfully accustoming their faithful users to exclusive and respective proprietary phrase utterances, or wake words, "Alexa" and "Ok, Google," to invoke automated task performance for turning on home lights, or for automated query responsiveness for prompting a news inquiry, for example. Automated speech recognition advancements have led to an even wider array of user-assisted products.

Computer and mobile devices employing voice-recognition features increasingly transition traditional user-based tasks to hands-free, machine-based automated actions. Voice-commanded opening of an electronic application, transcription of a text message, and transmission of an email message are ubiquitous and increasingly expected device features. Take the iPhone, for example, featured with an automated speech-to-text application, the mobile device leverages Siri to transcribe user-uttered speech into a text phrase or a text sentence, hands-free. Transcribed dictation is yet another example of a prevalent consumer device speech-to-text automation application. Companies like Rev.com, offering automated speech recognition (ASR) services, have successfully implemented artificial intelligence algorithms to facilitate long document dictation transcription automation.

But ASR generates a predicted rather than an exact outcome, offering less than a perfected service. The text equivalence of mobile device user utterances or desktop computer user dictations can be fraught with words, phrases, and sentences, neither user-uttered, nor user-intended. Even when tagged, erroneously transcribed words and phrases remain faulty in subsequent re-transcription attempts. Current speech transcription automation mechanisms fall short of taking full advantage of word and phrase contextualization. For example, in the uttered phrase, "You can probably use this to get a higher throughput," the word "higher" may be erroneously transcribed as "buyer." However, while it may be flagged for faultiness, when the word is re-transmitted for re-transcription in the hopes of replacing the erroneously transcribed "buyer," it is provided in isolation, without benefit of companion phrase words. Not only does re-transmission risk yet another failed re-transcription attempt, e.g., "fire" instead of "higher," transmission-based third-party transcription service charges are at risk of increase. Analogously, an erroneously transcribed yet flagged sentence of a dictated long document may be re-transmitted to an ASR service provider without the benefit of a sentence-in-document identifier, information vital to increasing the probability of precise speech recognition with sentence frequency usage implementations.

In short or in long dictation applications, imprecise transcription is generally not the sole source of present-day speech-to-text automation shortcomings—added charges are yet another. As noted above, typically, each time an audio file is re-transmitted to a third-party ASR transcription service, an additional charge is realized; accordingly, with each erroneous transcription, an additional expense results.

In accordance with various embodiments and methods of the disclosure, a speech processing system receives a first transcription of a first utterance. In response to receiving an indication of an erroneous transcribed word in the first transcription, a control circuitry automatically activates an audio receiver for receiving a second utterance. In response to receiving the second utterance, an output circuitry transmits an audio file of the second utterance and an indication of a location of the erroneously transcribed word within the first transcription to a speech recognition system for a second transcription of the second utterance. The erroneously transcribed word in the first transcription is subsequently replaced with a transcribed word from the second transcription. The audio file may be transmitted to an automated speech recognition service for transcription.

In some embodiments, the location of the erroneously transcribed word within the first transcription corresponds to a like location within the second utterance. The indication of the location of the erroneously transcribed word within the first transcription is a location identification of the erroneous transcribed word within the first utterance or the second utterance. The location identification of the erroneously transcribed word may include a start location and an end location of the erroneously transcribed word within the first transcription. In some embodiments, the start location of the erroneously transcribed word is a character number of a first character in the erroneously transcribed word and the end location of the erroneously transcribed word is a last character number in the erroneously transcribed word. The character number of the first character in the erroneously transcribed word and the character number of the end character in the erroneously transcribed word are relative to character numbers of all characters in the first transcription. The indication of the erroneously transcribed word in the first transcription may be a screen highlight of the erroneously transcribed word.

The second utterance may be received in response to automatically activating the audio receiver, such as by automatically activating a microphone feature of a handheld device. Each of the first utterance and the second utterance corresponds to a short dictation, and the short dictation may be received at a handheld device.

In some embodiments and methods of the disclosure, speech transcription is processed in a speech processing system by receiving a number of transcriptions originating from various utterances and assigning identifications to the transcriptions. In response to receiving an indication of an erroneously transcribed utterance in at least one of the transcriptions, a control circuitry automatically activates an audio receiver for receiving a second utterance. In response to receiving the second utterance, an audio file of the second utterance is transmitted, at an output circuitry, with a corresponding identification of the erroneously transcribed utterance to a speech recognition system for a second transcription. The erroneously transcribed utterance is replaced with the second transcription. The corresponding identification of the erroneously transcribed utterance may be a pointer identifying an utterance location within the transcriptions or it may be the actual utterance location within the transcriptions. The audio file may be transmitted to an automated speech recognition service for transcription.

In response to receiving the transcriptions, the control circuitry parses the transcriptions into multiple transcribed utterances identified by assigning to each a corresponding identification uniquely identifying a location of a transcribed utterance within the first transcription.

In some embodiments, the indication of the erroneously transcribed utterance may be a screen highlight of the erroneously transcribed utterance.

The second utterance may be received in response to automatically activating the audio receiver such as by activating a microphone feature of a personal computer or a tablet. In some embodiments, the first transcription corresponds to a long dictation, and the long dictation may be received at a personal computer or a tablet.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

The present disclosure is, in some embodiments, directed to methods and systems for automatic retrieval of application programs from corresponding websites without user intervention, and more particularly to temporary download and installation of some application programs from websites corresponding to anticipated user activities.

Figure 1:
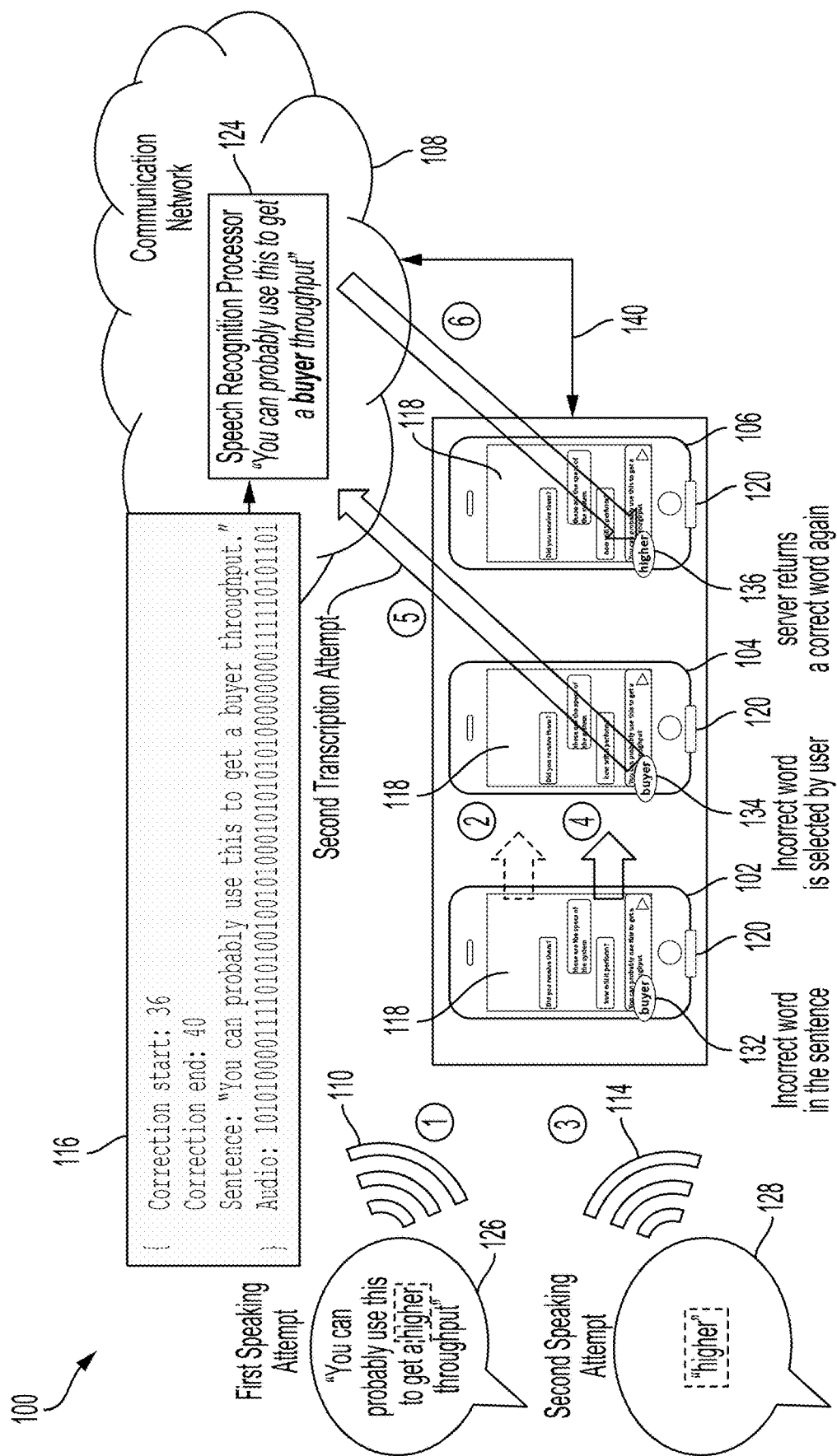
FIGS. 1-3 each show an illustrative block diagram of a distinct speech processing system, in accordance with some embodiments of the disclosure.

FIG. 1 shows an illustrative block diagram of a speech processing system 100, in accordance with some embodiments of the present disclosure. In some embodiments, system 100 implements speech-to-text processing operations on single-phrase speech input for short dictation on user handheld devices (e.g., smartphones) and on multi-phrase speech input for long dictation on user personal computer devices (e.g., laptops, desktops, and tablets).

System 100 is shown to include a speech recognition device 102 coupled to a communication network 108 through interface 140, in accordance with various disclosed embodiments. Speech recognition device 102 is shown to include a user display 118 and an audio signal receiver 120. Communication network 108 is shown to include a speech recognition processor 124. In some embodiments, speech recognition device 102 may be implemented, in part or in whole, in hardware, software, or a combination of hardware and software. For example, a processor (e.g., processing circuitry 840 of FIG. 8) executing program code stored in a storage location, such as storage 838 of FIG. 8, may perform, in part or in whole, some of the speech recognition functions of device 102 disclosed herein. Device 102 may be any computing device with features suitable for performing speech-to-text processing of various embodiments and methods of the disclosure. In some embodiments, speech recognition device 102 may be a user device, such as a user smartphone. Speech recognition device 102 may be a user device (or computing device) as shown and described relative to FIG. 8.

Similarly, speech recognition processor 124 may be implemented, in part or in whole, in hardware, software, or a combination of hardware and software. For example, a processor (e.g., processing circuitry 840 of FIG. 8) executing program code stored in a storage location, such as storage 838 of FIG. 8, may perform, in part or in whole, some of the speech recognition functions of processor 124 disclosed herein.

Communication network 108 may be a wide area network (WAN), a local area network (LAN), or any other suitable network system. Communication network 108 may be made of one or multiple network systems. In some embodiments, communication network 108 and device 102 are communicatively coupled by one or more network communication interfaces. In some example systems, communication network 108 and device 102 may be communicatively coupled by the interfaces shown and discussed relative to FIG. 8. In an example embodiment, communication network 108 communicates with device 102 through interface 140 as shown and discussed relative to a communication network 814 and a computing device 800, respectively, of FIG. 8. Communication network 108 and device 102 may be communicatively coupled in accordance with one or more suitable network communication interfaces.

In accordance with an embodiment, speech recognition device 102 receives audio signals at audio signal receiver 120, processes the received audio signals locally for speech recognition, and may transmit the processed audio signals to communication network 108 for further speech recognition processing. For example, speech recognition device 102 may receive audio signals 110 and 114, process the received signals 110 and 114 for speech processing with a processor and transmit the processed audio signals in the form of a processed speech file (or audio file) to speech recognition processor 124 of communication network 108 for further voice recognition processing. In some embodiments, device 102 includes one or more processors, such as processing circuitry 840 of FIG. 8, for processing the signals 110 and 114.

In some embodiments, processor 124 transmits the processed speech file to a third-party transcription service for automated speech recognition to transcribe voice into text and receive a text file corresponding to the transmitted processed speech file. For example, processor 124 may send the processed audio file to Amazon Transcribe or Google Speech-to-Text services for speech recognition processing. Alternatively, device 102 may directly send the processed audio file to a third-party automated speech recognition (ASR) service. Most present-day third-party ASR services charge per audio file; accordingly, fewer audio file transmissions realize cost-effectiveness.

In some embodiments, device 102 receives signals 110 and/or 114, and stores the received signals locally, within device 102, for processing. Device 102 may receive incoming audio signals, such as signals 110 and 114, through an audio receiver 120. Audio receiver 120 may be any receiver local or remote to device 102 suitable for receiving audible sounds, such as, without limitation, human speech. An example of audio receiver 120 is provided relative to the discussion of FIG. 1 to follow. Alternatively, device 102 may save the received signals 110 and 114 remotely, for example, in a storage location within communication network 108 or in a storage location outside of communication network 108 and coupled to device 102. Device 102 may store signals 110 and 114 partially locally and partially remotely. In some embodiments, device 102 stores signals 110 and 114 in storage 838 of FIG. 8. Each of signals 110 and 114 may comprise one or more audio signals.

Device 102 includes a device display 118 for displaying text to a user. For example, device 102 may receive one or both of signals 110 and 114, carrying utterances 126 and 128, respectively. Utterances 126 and 128 may be duplicate utterances verbalized at different times and generally corresponding to a short dictation, for example, a sentence or a phrase. In some embodiments, utterance 128 is a shorter utterance than utterance 126. For example, utterance 128 may be limited to a repeat of the particular utterance erroneously transcribed in utterance 126, e.g., the erroneous transcribed word, "higher," in utterance 126, for example. In some embodiments, utterance 128 may include more than the erroneous transcribed word and less than the entire utterance 126. In some embodiments, utterance 128 may include more than the erroneous transcribed word or the entire utterance 126, in cases where a remote speech recognition system, such as speech recognition processor 124 or other components aiding processor 124 in the recognition process, do not store utterance 126 and therefore lack contextual information regarding the erroneously transcribed part of the utterance.

Device 102 may next process utterances 126 and 128 and transmit the processed messages to communication network 108 for further processing as described below. In accordance with an example embodiment of the disclosure, with continued reference to FIG. 1, at 1., device 102 receives signals 110 carrying utterance 126, "You can probably use this to get a higher throughout," a first speaking attempt, through receiver 120 for processing. As a first attempt, device 102 converts received audio signals 110 to text and displays the text on device display 118 for viewing. But device 102 displays a message not reflecting the original utterance 126 and instead displays the phrase with an erroneous word, "buyer," in place of the intended word "higher" at 132 on display 118. In response to an input from a viewer or user of device 102 indicative of the erroneous word, "buyer," device 102 may re-attempt transcribing utterance 126 in a number of manners. Device 102 may transmit the erroneous transcription to a speech recognition processor 124 of communication network 108 for a transcription re-attempt, attempt to re-transcribe utterance 126 in solo, or transmit utterance 126 to yet another speech processing service, or re-attempt recognition by performing a combination of the foregoing functions or other speech recognition processing.

In some embodiments, speech recognition processor 124 is a third-party ASR service charging for speech-to-text transcription per audio file, per audio file size, per number of transcriptions of the same message, per user, per subscription, by using other speech-to-text transcription charging models, or a combination thereof. Processor 124 may be a third-party ASR service that may offer speech-to-text transcription free-of-charge or charge for the service for speech recognition processing of a received audio file comprising audio signals representing one or more utterances, phrases, sentences, or a combination thereof. Processor 124 need not be a third-party ASR service and may be any suitable recognition mechanism facilitating speech-to-text conversation. In some embodiments, processor 124 may employ various speech recognition algorithms for converting an audio file.

Device 102 may be notified by a user at 2. in FIG. 1 of one or more erroneous transcribed words by receiving a user input indicative of the error. For example, device 102 may receive a user input indicative of a screen highlight, encirclement, or other identification of the erroneously transcribed word, such as shown by the circle surrounding the erroneous transcribed word "buyer" shown at 132 in FIG. 1. In some embodiments, device 102 may employ other techniques to detect an erroneously transcribed word. For example, device 102 may compare an incoming utterance against saved utterances of a database. The saved utterances may be predictions of an utterance transcription based on past user activity, actions, other behavior, or a combination thereof. Device 102 may implement speech-to-text prediction techniques to arrive at and display the text-converted speech. For example, device 102 may facilitate speech prediction with the assistance of models trained to predict speech based on one or more particular user audio spectral characteristics, user gender, user demography, other suitable speech traits, or a combination thereof. In some embodiments, device 102, processor 124, or both may employ various recognized speech recognition algorithms, such as, without limitation, a segmental conditional random field (CRF) algorithm or use of a hidden Markov model (HMM) or a long-short term model (LSTM), for speech recognition prediction.

In some embodiments, in response to receiving an indication of an erroneous transcribed word in the transcription of utterance 126, device 102 automatically activates audio receiver 120 for receiving a second utterance, namely, utterance 128. Utterance 128 may include the erroneously transcribed word during utterance 126, e.g., "higher." At 3. in FIG. 1, device 102 receives utterance 128, as carried by signals 114 and received at receiver 120 and displays the second attempted transcribed text on display 118 of device 102 for viewing by a user as shown at state 104 of device 102. Alternatively, as previously discussed, device 102 may first attempt further processing of utterance 126, for example remotely, by processor 124, as a second attempt at transcription before receiving utterance 128 or before detecting corrected transcription of the entire utterance, "You can probably use this to get a higher throughput." The second transcription may be correct, include the same error as the first transcription, or include one or more different transcribed errors. In the case of no errors, device 102 either continues to wait for a user input until a time-out and/or proceeds with other tasks. In the case where the same or different errors are included in the second transcription and an indication of the error(s) is detected, for example, without limitation, a word highlighted or otherwise emphasized by user input, for example, a word encircled by user input, as shown at 134 of state 104 of device 102 in FIG. 1. At 5., device 102 transmits an audio file 116 including the second transcription of "You can probably use this to get a higher throughput" based on the second attempted utterance, utterance 128, to communication network 108 for further speech-to-text processing. This scenario assumes that the entire first attempted utterance, utterance 128, is repeated by utterance 128. If only the erroneous word, "higher", is transmitted as utterance 128, device 102 may transmit both utterances, utterance 126 and utterance 128, in audio file 116 or resolve the discrepancy internally. For example, either device 102, through internal processing, or server 124 perform a search for audio signals corresponding to the word "higher" and the word in the identified word location in the phrase "You can probably use this to get a higher throughput" to transcribe the erroneous word "higher" correctly. In this scenario, device 102 stores the first utterance, utterance 126, locally for retransmission to server 124. For example, device 102 may save utterance 126 in 838 of FIG. 8. Alternatively, or additionally, server 124 may save utterance 126. For example, server 124 may save utterance 124 in 824 of FIG. 8.

Notably, in some embodiments, in response to receiving an indication of an erroneous transcribed word in the first transcription, for example, at 132 or 134, device 102 may automatically activate audio receiver 120 for receiving the second or a subsequent utterance, as the case may be. In a non-limiting example, audio file 116 activates audio receiver 120 by configuring a device setting or causing an audio receiver to start or power on. Receiver 120 may be a microphone or other suitable audio-receiving mechanism with a wired or wireless connection configurable to selectably cause the microphone to listen for audio signals.

In some embodiments, device 102 may transmit the received utterance for the benefit of enhanced speech recognition capability. In some cases, device 102 may not even attempt to locally transcribe either the first or subsequent utterances and may instead transmit each utterance or a subset of received utterances in the form of audio signals in an audio file to processor 124 for remote processing.

In accordance with various embodiments and methods discussed and shown herein, device 102 generates audio file 116 prior to transmission to communication network 108. Audio file 116 includes information relating to the received utterance that gave rise to the erroneous transcription at 134. Device 102 further includes audio signals representing utterance 126. Audio file 116 may be constructed in various ways, with various contents, to meet various requirements.

Audio file 116 may include audio signals representing the second utterance and an indication of a location of the erroneous transcribed word within the first transcription, i.e., transcription of utterance 126.

At 6., device 102 receives a transcription of utterance 128 and may display the received transcription at device display 118 of device 102, shown at state 106 in FIG. 1. The received transcription, at 6., is a correct transcription of all words of the utterance 128 including the word "higher," and the erroneously transcribed word, "buyer" or "fire," appears as the correct transcribed word from the transcription received at 6.

In scenarios where server 124 transcribes the erroneous word rather than the entire utterance, therefore, device 102 receives a transcription of merely the erroneous word, device 102 may replace the erroneously transcribed word from a prior transcription with the correctly transcribed word from the current transcription at least in part because of the contents of audio file 116.

Processor 124 receives audio file 116, which includes audio signals representing utterance 128, as previously noted. Processor 124 may detect the beginning and ending of the audio signals representing utterance 128 by implementing a segmental conditional random field (CRF) algorithm or using a hidden Markov model (HMM) or a long-short term model (LSTM) to predict the end of the audio signal corresponding to utterance 126. In implementations using model-based prediction, such as with the use the HMM or LSTM models, the model may be trained to predict whether the utterance is a start of the phrase or sentence or the last word of the phrase or sentence.

In addition to the utterance, as part of the audio file 116, processor 124 may receive location information of the erroneously transcribed word within the transcription of utterance 126. In constructing audio file 116, device 102 may add the location of the erroneously transcribed word in the transcription of utterance 126. The location of the erroneously transcribed word within the transcription of utterance 126 may correspond to a like location within the transcription of utterance 128. For example, in the utterance "You can probably use this to get a higher throughput," the word "higher" occupies character numbers 3540 of the 51 total character count of utterance 126. Accordingly, the indication of the location of the erroneously transcribed word within the initial faulty transcription may be a location identification of the erroneously transcribed word within the corresponding utterance, utterance 126, and within the second utterance, utterance 128.

In some embodiments, the location identification of the erroneous transcribed word of utterance 126 includes a start location and an end location of the erroneous transcribed word within the corresponding transcription. The start location of the erroneous transcribed word may be a character number of a first character in the erroneous transcribed word and the end location of the erroneous transcribed word may be the last character number in the erroneous transcribed word. The character number of the first character in the erroneous transcribed word and the character number of the end character in the erroneous transcribed word may therefore be relative, not absolute, to character numbers of all the characters in the corresponding transcription. To continue with the above example, the first character of the erroneous transcribed word, "higher", is "h" and the last character of the erroneous transcribed word is "r," and "h" is the $35^{th}$ character count of the 51 total character count of "You can probably use this to get a higher throughput" and "r" is the $40^{th}$ character number of the 51 total character count of "You can probably use this to get a higher throughput."

In summary, in the embodiment of FIG. 1, audio file 116 includes the following information:

Correction start: 36
Correction end: 40
Sentence: "You can probably use this to get a buyer throughtput."
Audio:
1010100001111010100100101000101010101000000000111 1101101

The "Correction start" field of audio file 116 is an indicator of a location within utterance 126 "You can probably use this to get a higher throughput" where the erroneous transcribed word (word to be corrected) begins, and the "Correction end" field of audio file 116 is an indicator of a location within utterance 126 "You can probably use this to get a higher throughput" where the word to be corrected ends. As noted in the discussion above, the word to be corrected, "higher," starts at character number 35 and ends at character number 40 within the 51 total character count of "You can probably use this to get a higher throughput". The Correction start and Correction end fields in the above example are therefore based on character count. It is understood that the erroneous transcribed word may be identified with indicators other than character count in audio file 116. For example, the erroneous transcribed word may be identified by the word number, rather than the character number, relative to the total word count. In the above example, "higher" can be identified by the number "9", indicating the $9^{th}$ word in the utterance "You can probably use this to get a buyer throughput" is incorrect. In this case, the Correction start and Correction end fields would be the same, and in some embodiments, one of the fields may be eliminated. For example, the Correction start and the Correction end fields may be combined into a single field. Other suitable manners of identifying an erroneous transcribed word in an utterance of an audio file are contemplated. Location identification of the erroneous transcribed word provides contextual information to processor 124 for improved utterance recognition. For example, in the above example, processor 124 may use neighboring words, "a" and "throughput", to predict the correct word, "higher", by limiting the prediction to a relative measure of or an adjective descriptor of "throughput" or by maybe eliminating parts of speech a word can be, such as a noun. In this manner, identification of the erroneous transcribed word may assist processor 124 with an improved prediction of utterance 126 in a second attempt at properly transcribing utterance 126. If processor 124 erroneously predicts "buyer" instead of "higher," processor 124 may further narrow the prediction by use of two rounds of transcriptions and, therefore, two distinct instances of an erroneously transcribed word in a common location within utterance 126, "buyer" and "fire." Processor 124, in such embodiments, may maintain a history of the instances of the erroneously transcribed word in association with the location identifier of the erroneous transcribed word within the corresponding utterance and an identifier of the audio file, in the example of FIG. 1, audio file 116. Alternatively, or additionally, device 102 may maintain the foregoing history and identifier to transmit the same to processor 124.

Audio file 116 may further include transcription of utterance 126, "You can probably use this to get a buyer throughput" to further contextually aid processor 124 when attempting to recognize the erroneous transcribed word in a like location in utterance 126. Device 102 may include utterance 126 in audio file 116, even during second, third or any subsequent prediction attempts, to alleviate the requirement for processor 124 to maintain such information in order to reduce the costs associated with storage requirements at communication network 108 or elsewhere at a storage location. In some embodiments, processor 124 or communication network 108 may maintain a history of utterances received from users such as device 102, in which case, audio file 116 need not include utterance 126.

As previously described, audio file 116 may include audio signals representing utterance 126, the "Audio" field in the above reference. Audio signals representing utterance 126 are in digital form, made of "1"s and "0"s, as shown above. By having knowledge of the correct utterance, utterance 126 in this case, processor 124 is provided with greater insight into the wrongly predicted word. That is, processor 124 is privy to both words, the correct version of the word as well as the erroneous version of the word. Processor 124 may choose to utilize this information for improving prediction.

Figure 8:
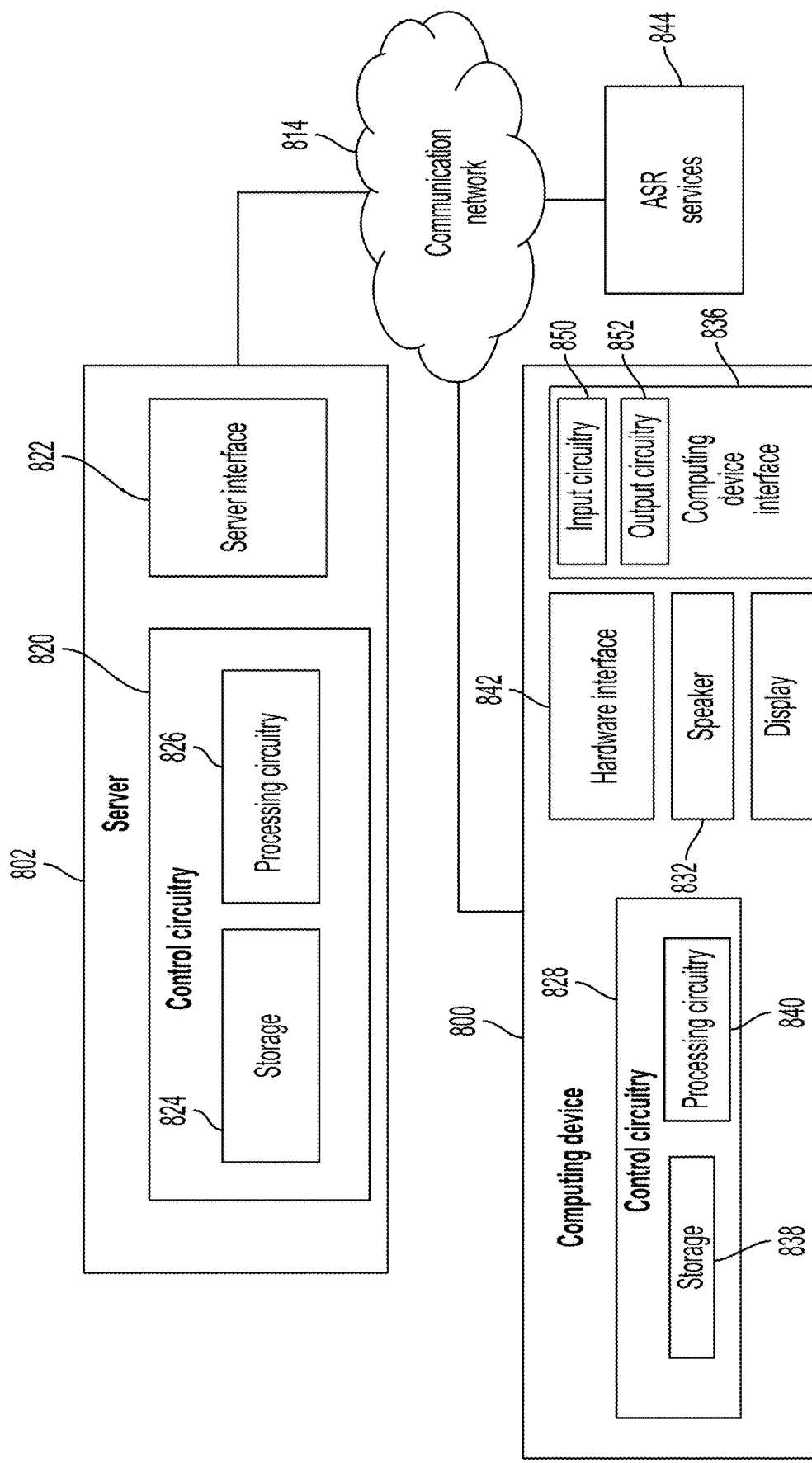
FIG. 8 is a block diagram of an illustrative system for performing speech-to-text processes, in accordance with some embodiments of the present disclosure.

At 6. in FIG. 1, device 102 may receive the indication of the erroneous transcribed word in the transcription of utterance 126 from processor 124 at an input circuit, for example, input circuitry 850 of FIG. 8. At 5., device 102 may transmit audio file 116 to communication network 108 at an output circuit, for example, output circuitry 852 of FIG. 8.

As shown and discussed relative to the example embodiment of FIG. 2 below, device 102 need not transmit audio signals representing the entirety of utterance 126 as a part of audio file 116. In some embodiments, device 102 transmits less than the entire utterance. Alternatively, or additionally, device 102 need not transmit the audio signals corresponding to utterance 128 to processor 124; instead, device 102 may transmit a pointer to a location of the utterance transcription to processor 124. For example, device 102 may send a pointer, a linked list, or a flag to a memory location of a storage housing the audio signals to processor 124. Device 102 may send a pointer, linked list, or a flag pointing to a memory location of a storage housing audio file 116, to processor 124. For example, the audio signals corresponding to utterance 128 and audio file 116 may be stored in a memory location of storage 824 of FIG. 8.

Figure 2:
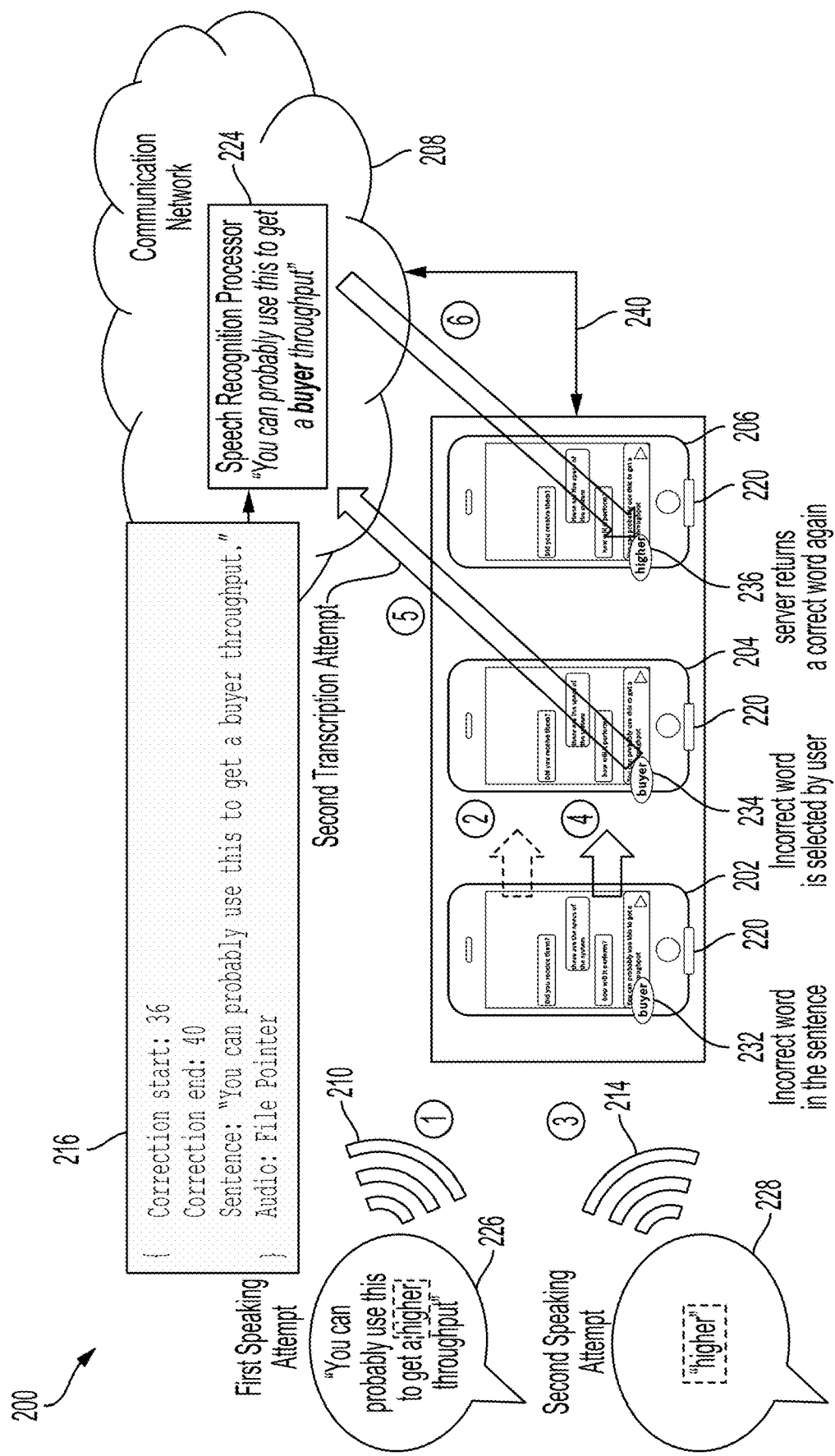

FIG. 2 depicts of an illustrative speech recognition system 200, in accordance with an embodiment of the disclosure. In some embodiments, system 200 may be configured analogously to system 100 of FIG. 1 except as otherwise indicated below or shown in FIG. 2. In FIG. 2, system 200 is shown to include a speech recognition device 202 coupled to a communication network 208 through an interface 240, in accordance with various disclosed embodiments. Communication network 208 is shown to include a speech recognition processor 224 for predicting an utterance transmitted from device 202, as shown and described above relative to FIG. 1. In an example embodiment, communication network 204 communicates with device 202 through interface 240 as shown and discussed relative to communication network 814 and computing device 800, respectively, of FIG. 8. Communication network 208 and device 202 may be communicatively coupled in accordance with one or more suitable network communication interfaces.

During operation, device 202 receives utterance 226 for a first attempt at transcribing utterance 226. Device 202 may choose to endeavor to transcribe utterance 226 by itself or with the help of a recognition device, such as processor 224. Processor 224 may be a part of an ASR service remotely located relative to device 202, as discussed above with relation to processor 124 and device 102 of FIG. 1. In the event of a failed transcription attempt, as displayed at a state 204 of device 202, specifically, at 232 pointing to the incorrect transcribed word "buyer", device 202 may transmit an audio file 216 for transcription by processor 224. In response to the transcription request, device 202, in the embodiment of FIG. 2, may receive a text file of the transcribed utterance 236 from processor 224. Similarly, with respect to the embodiment of FIG. 1, processor 124 may transmit, at 6., a text file of the transcription of utterance 126 to device 102.

As described with reference to FIG. 1, a second attempt at speaking the utterance of the first attempt, utterance 226, may be received in response to an erroneously transcribed word corresponding to utterance 226 and activation of an audio receiver to listen for a subsequent utterance. In the embodiment of FIG. 2, device 202 receives utterance 228 as a second speaking attempt. Utterance 228 may include only the uttered equivalent of the erroneously transcribed word, "higher," or more, as previously noted with respect to FIG. 1.

With continued reference to FIG. 2, audio file 216 includes location identification fields "Correction Start," "Correction End," the erroneous transcription of utterance 226, and an "Audio" field, as discussed relative to audio file 116. But audio file 216 differs from audio file 116 in that the "Audio" field of audio file 216 is not made of audio signals representing the entirety of utterance 226 and is instead a compact version of the same information. For example, the "Audio" field of audio file 226 may be a pointer to the audio signals corresponding to utterance 226. The pointer may identify a memory or storage location in which the audio signals corresponding to utterance 226 can be found. For example, the memory location may be a location in storage 838 of FIG. 8. The "Audio" field pointer may itself be a pointer to yet another memory location where yet another pointer or the actual audio signals may be found. Alternatively, the "Audio" field of audio file 226 may be a flag or an indicator of sorts identifying the location of the audio signals. In some embodiments, the "Audio" field comprises a compressed version of the audio signals. In such cases, device 202 (or device 102 in FIG. 1) may compress the audio signals representing utterance 226 prior to transmission to processor 224 and may generate audio file 226 to include the compressed audio signals before transmission of audio file 226 to processor 224. Audio signal compression prior to audio file transmission at 5. in FIGS. 1 and 2 can save transmission bandwidth.

In some embodiments, with continued reference to FIG. 2, device 202 may transmit audio signals representing a portion, instead of the entirety, of utterance 226 or a compressed version of a portion of utterance 226 for bandwidth consumption and performance improvement. For example, device 202 may transmit audio signals corresponding to the portion of utterance 226 through the erroneous transcribed word, i.e., "You can probably use this to get a higher," or an even shorter version of utterance 226, " . . . this to a higher." While transmission of shorter portions of utterance 226 may save bandwidth increase throughput and system speed performance, it may adversely affect the prediction feature capability of processor 224 due to fewer contextual clues as to the correctly transcribed word.

Figure 3:
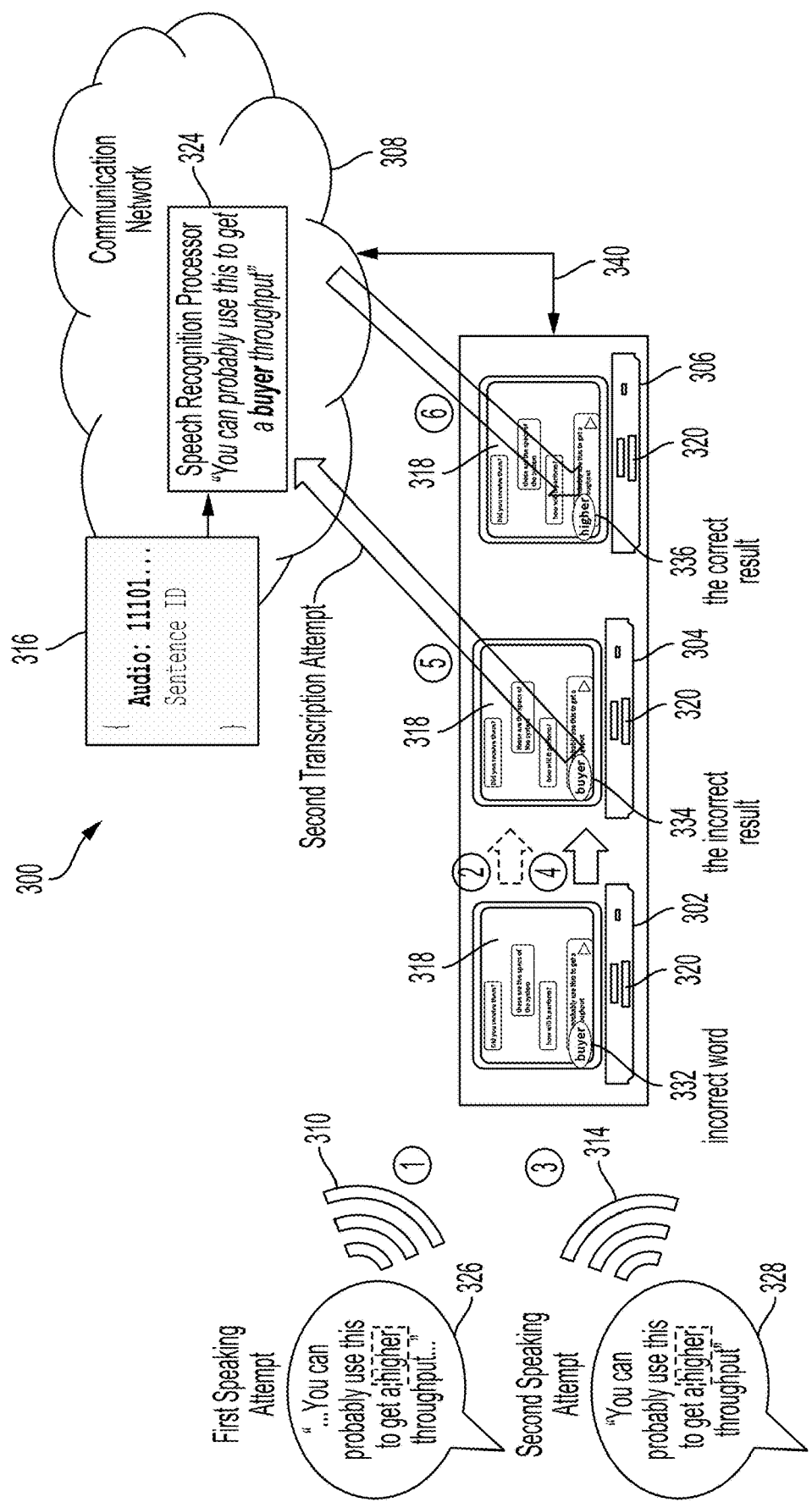

As previously noted, in accordance with some embodiments, system 100 implements speech-to-text processing operations on single-phrase speech input (e.g., "You can probably use this to get a higher throughput") for short dictation on a user handheld device (e.g., smartphone). As further previously stated, in some embodiments, speech-to-text processing operations are performed on multi-phrase speech input for long dictation by user personal computer devices (e.g., laptops, desktops, and tablets). FIG. 3 shows an example of a long dictation speech-to-text processing system.

FIG. 3 depicts an illustrative speech recognition system 300, in accordance with an embodiment of the disclosure. In some embodiments, system 300 may be configured analogously to system 100 of FIG. 1 or system 200 of FIG. 2 except as otherwise indicated below or shown in FIG. 3. In FIG. 3, system 300 is shown to include a speech recognition device 302 coupled to a communication network 308 through an interface 340, in accordance with various disclosed embodiments. Communication network 308 is shown to include a speech recognition processor 324 for predicting an utterance transmitted from device 302, as shown and described above relative to FIGS. 1 and 2. In an example embodiment, communication network 308 communicates with device 302 through interface 340 as shown and discussed relative to communication network 814 and computing device 800, respectively, of FIG. 8. Communication network 308 and device 302 may be communicatively coupled in accordance with one or more suitable network communication interfaces.

In the embodiment of FIG. 3, device 302 is a stationary user device, such as laptop or a desktop or otherwise a computing device configured for long dictation, for example, a presentation document. In some embodiments, as noted relative to devices 102 and 202 of FIGS. 1 and 2, device 302 may be a user device as described with reference to FIG. 8.

During operation, as discussed with reference to FIGS. 1 and 2, device 302 receives utterances 326 at 1., and displays the received utterances, at 2., on a device display 318 of device 302, shown at a state 304 of device 302. A collection or group of utterances 326 generally comprise a long dictation, for example, without limitation, a PowerPoint presentation. In some embodiments, device 302 assigns an identifier to each of the utterances of the collection of utterances. For example, assuming a collection of utterances made of dictated sentences, device 302 may assign a sentence identification to each utterance. A sentence identification (ID) may be a number or a character identifying the location of a sentence (or a phrase) within the received collection of utterances 326 that comprises a long dictation. In some embodiments, an identification of a corresponding erroneous transcribed utterance, transmitted with audio file 316, may be a pointer instead of the actual identification indicator for identifying an utterance location within the transcriptions 326 or the wrongly transcribed utterance. Whether a pointer or an actual location, the identification field of audio file 316 uniquely identifies a location of a transcribed utterance within the transcriptions of utterances 326. In some embodiments, processor 324, either locally or remotely, stores the utterances in a collection of utterances. For example, processor 324 may maintain the set of utterances 326. Processor 324 may maintain a pointer, flag, or other memory location information for finding the location of utterances 326. With the benefit of maintaining the utterances 326, device 302 is not required to transmit the entire long dictated document and may send the erroneously transcribed utterance portion of the document only.

Being privy to the identification information of the utterance in question (the utterance with a corresponding faulty transcription), processor 324 benefits from contextual information. For example, processor 324 may predict the utterance with greater accuracy given the benefit of neighboring utterances. Certain speech recognition models consider neighboring words and/or letters when making predictions, and improved prediction outcomes may ensue accordingly. In some cases, maintaining a history of user utterances may prove helpful in improving prediction. For example, speech data may be fed into a machine learning speech recognition algorithm for learning sentence usage for a particular user or a group of users based on various attributes, e.g., demography, gender, etc., as previously noted. The trained model may then be implemented to predict a previously erroneously predicted sentence. In yet other embodiments, the frequency usage of the erroneously transcribed utterance may help to promote prediction precision. For example, processor 324 may maintain a history of a correspondence between a particular user and utterances, and the utterance in question may be a frequently utilized utterance by a particular user, in which case, the prediction may rightly fall in favor of the popular utterance. In other embodiments, the popularity of a given utterance, for example, a sentence, may be maintained across all users or users of a particular type, such as users with interest in a particular field or users of a particular occupation. Continuing with the above example, if the group of users for which a history of association with commonly employed utterances is maintained is a group in the field of networking, processor 302 may have a bias toward a relative descriptor, "higher", than a noun purchaser, "buyer". In some embodiments, a combination or all of the above and other suitably contemplated improvement features may facilitate improving the speech recognition quality of the various utterances discussed above and herein.

Device 302 may then attempt to transcribe the group of utterances 326 and if device 302 detects one or more transcriptions of utterances 326 as erroneous, device 302 may automatically activate an audio receiver 320 to listen for a repetition of utterance 326, utterance 328, at 3. in FIG. 3. At 4., device 302 may receive an indication of an erroneous transcribed word in either a first transcription attempt of utterance 326 or a second transcription attempt of utterance 328, such as shown at 334 in FIG. 3. Device 302 may receive an erroneous transcribed word indication by a screen highlight or other emphasis of the erroneous transcribed word, as earlier discussed with reference to FIG. 1.

In response to at least one erroneously transcribed utterance of the received collection of utterances, device 302 may generate and transmit an audio file 316, at 5. in FIG. 3, to processor 324 for enhanced speech recognition of utterances 326. In response to transcriptions of utterances 326, either locally by device 302 or remotely by processor 324 or another recognition system, device 302 may display, at device display 318, a transcription of utterance 326 including one or more erroneously transcribed words, such as "buyer" instead of "higher", as shown at 334 in FIG. 3.

After transmitting audio file 316 to processor 324 at 5., in response to the completion of transcriptions of utterances 326 by processor 324, at 6., device 302 receives a text file including the transcriptions of utterances 326 and may replace the erroneous utterance with the corrected utterance received from processor 324. Device 302 is aware of the identity of the erroneous utterance by use of the utterance (or sentence or phrase) identification and replaces an erroneous transcription of the utterance at a like location in the transcription of utterances 326 relative to the corrected transcription of the utterance in the transcription of utterances 328.

As with receivers 120 and 220 of FIGS. 1 and 2, respectively, an example of receiver 320 is a microphone, but receiver 320 may be any device suitable for listening for and receiving audible signals.

In some embodiments, audio file 316 comprises an utterance ID and corresponding audio signals representing an erroneously transcribed utterance of utterances 326. For example, in an embodiment with utterances 326 made up of sentences or phrases, an utterance ID is a sentence or phrase ID identifying the utterance in the Audio field of audio file 316, as discussed earlier relative to the Audio fields of audio files 116 and 216 of FIGS. 1 and 2, respectively. In some embodiments, however, for improved bandwidth and performance and based on who keeps a copy of the transmitted utterances, such as all of the utterances 326, the Audio field of audio file 316 is a digital representation of the one or more erroneously transcribed utterances of utterances 326 rather than the digital representation of all or most of utterances 326. Accordingly, the need to transmit all utterances may be obviated. For example, as each utterance of utterances 326 is received by device 302, the received utterance, whether erroneously or correctly transcribed or regardless of whether transcribed at all, may be transmitted to processor 324 for storage. In an example embodiment, processor 324 may store utterances in storage 838 of FIG. 8. In accordance with an alternative embodiment, device 302 may wait to receive all utterances of a group of utterances making up a dictated document and transmit all received utterances to processor 324 thereafter.

In some embodiments, as with the audio files 116 and 216 of FIGS. 1 and 2, respectively, device 302 may compress the audio signals of audio file 316 prior to transmission to processor 324. Alternatively, or additionally, as with the embodiments of FIGS. 1 and 2, processor 324 may compress a text file prior to transmission of the text file, at 6. in FIG. 3, to device 306 for better transmission and system performance.

As discussed relative to the embodiments of FIGS. 1 and 2, at 3., device 302 may activate receiver 320 awaiting receipt of repeated utterances, utterance 328, in response to detecting one or more transcriptions of corresponding utterances of utterances 326 are erroneous. In some embodiments, transcribed utterances correspond one-to-one to the utterances. For example, for every utterance of utterances 326, such as a sentence or a phrase, device 302 or processor 324 may generate a transcription of the utterance (e.g., sentence or phrase). In response to receiving transcriptions of utterances 326 or 328 at 1. or 3., respectively, device 302 may parse the transcriptions into transcribed utterances. Similarly, in a scenario with processor 324 receiving the utterances 326 or 328, processor 324 may parse transcriptions of the utterances. In some embodiments, device 302 or processor 324 may parse the utterances prior to transcribing each utterance.

Analogous to devices 102 and 202, device 302 may receive an indication of the erroneous transcribed utterance at an input circuitry. For example, the input circuitry may be responsive to a user input identifying an emphasized erroneously transcribed sentence or phrase. In some embodiments, the input circuitry is input circuitry 850 of FIG. 8.

Figure 4:
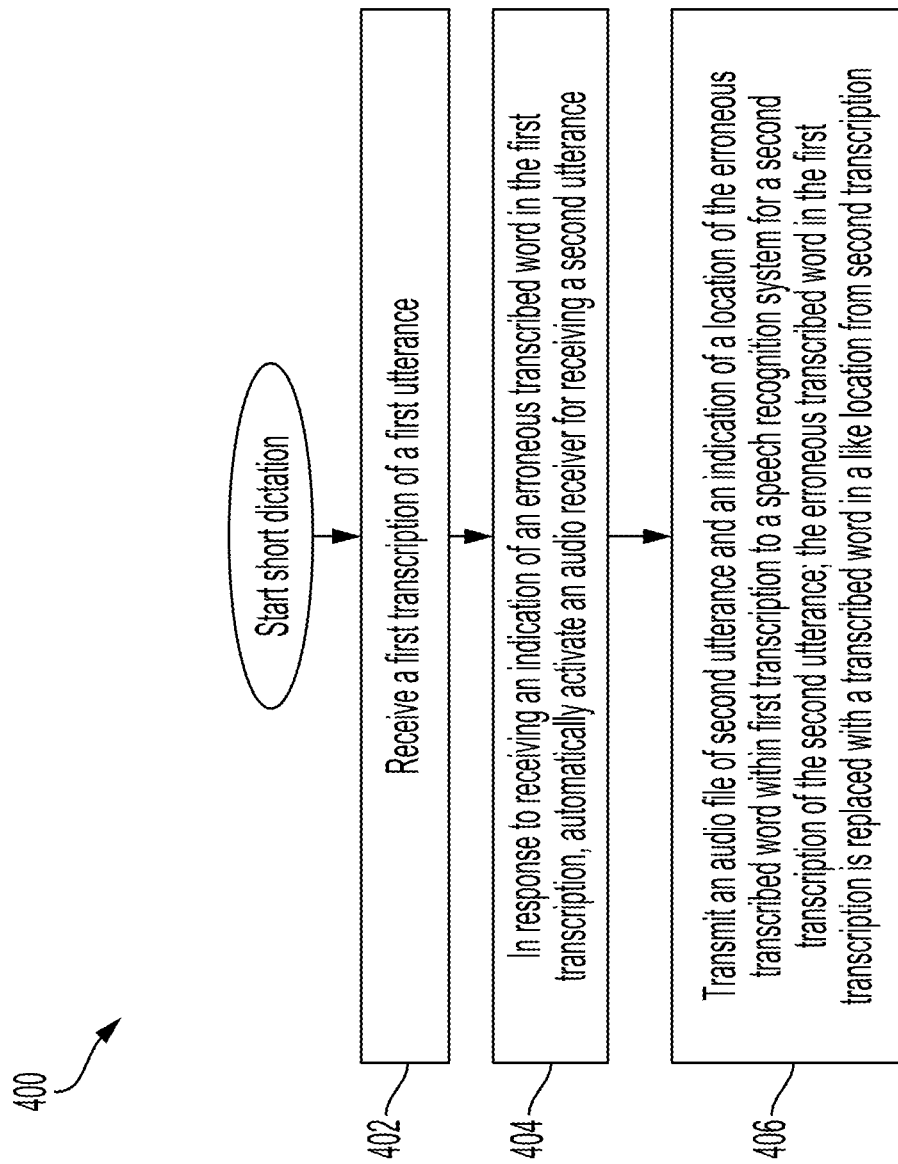
FIGS. 4-7 each depict an illustrative flowchart of a speech recognition process, in accordance with some embodiments of the disclosure.

FIG. 4 shows an illustrative flowchart of a speech recognition process, in accordance with some embodiments of the disclosure. In FIG. 4, a process 400 may be performed by a speech recognition device, such as devices 102 and 202 of FIGS. 1 and 2, respectively, to process incoming utterances. In some embodiments, the steps of process 400 may be performed by computing device 818 of FIG. 8. More specifically, control circuitry 828 of FIG. 8 may carry out some or all of the steps of process 400. In summary, process 400 presents an example of a method for processing a short dictation that is received as an utterance, such as a spoken sentence or phrase, in a speech recognition system.

The flow chart processes of FIGS. 4-7 are discussed below in reference to FIGS. 1, 2, and 3. In some embodiments, each of the processes of FIGS. 4-7 is performed by an agent residing in devices 102, 202, and 302, respectively. It is understood however that these processes may be implemented by embodiments other than FIGS. 1, 2, 3, suitable to carry out the steps of the processes of FIGS. 4-7.

The steps of FIG. 4 are now discussed with reference to device 102 of the embodiment of FIG. 1 and computing device 800 of FIG. 8. At step 402 of process 400, device 102 receives a first transcription of a first utterance. Alternatively, as previously discussed, device 102 may generate the first transcription. For example, device 102 may receive utterance 126 and generate a transcription corresponding to utterance 126 or request and receive a third-party transcription, as earlier discussed relative to FIG. 1. In some embodiments, where device 102 receives the first transcription rather than generates it, input circuitry 850 of computing device 800 may receive the first transcription. In some embodiments, processing circuitry 840 of computing device 800 executes program code stored in storage 838 to perform the steps of FIG. 4.

Next, at step 404, in response to receiving an indication of an erroneous transcribed word in the first transcription of step 402, device 102 may automatically activate an audio receiver for listening for and receiving a second utterance, for example, utterance 128. In an embodiment, computing device 818 includes or has access to an external microphone for receiving the second utterance at step 404. At step 406, device 102 transmits an audio file, such as audio file 116 of FIG. 1, including the second utterance (e.g., utterance 128) and an indication of a location of the erroneous transcribed word within the first transcription to a remote speech recognition system. For example, in the embodiment of FIG. 1, device 102 transmits the audio file to processor 124. As previously discussed, the indication at step 406 may be a location of the erroneously transcribed word in the transcription corresponding to the first utterance, which would correspond to a like location of the word in the second transcription.

Figure 5:
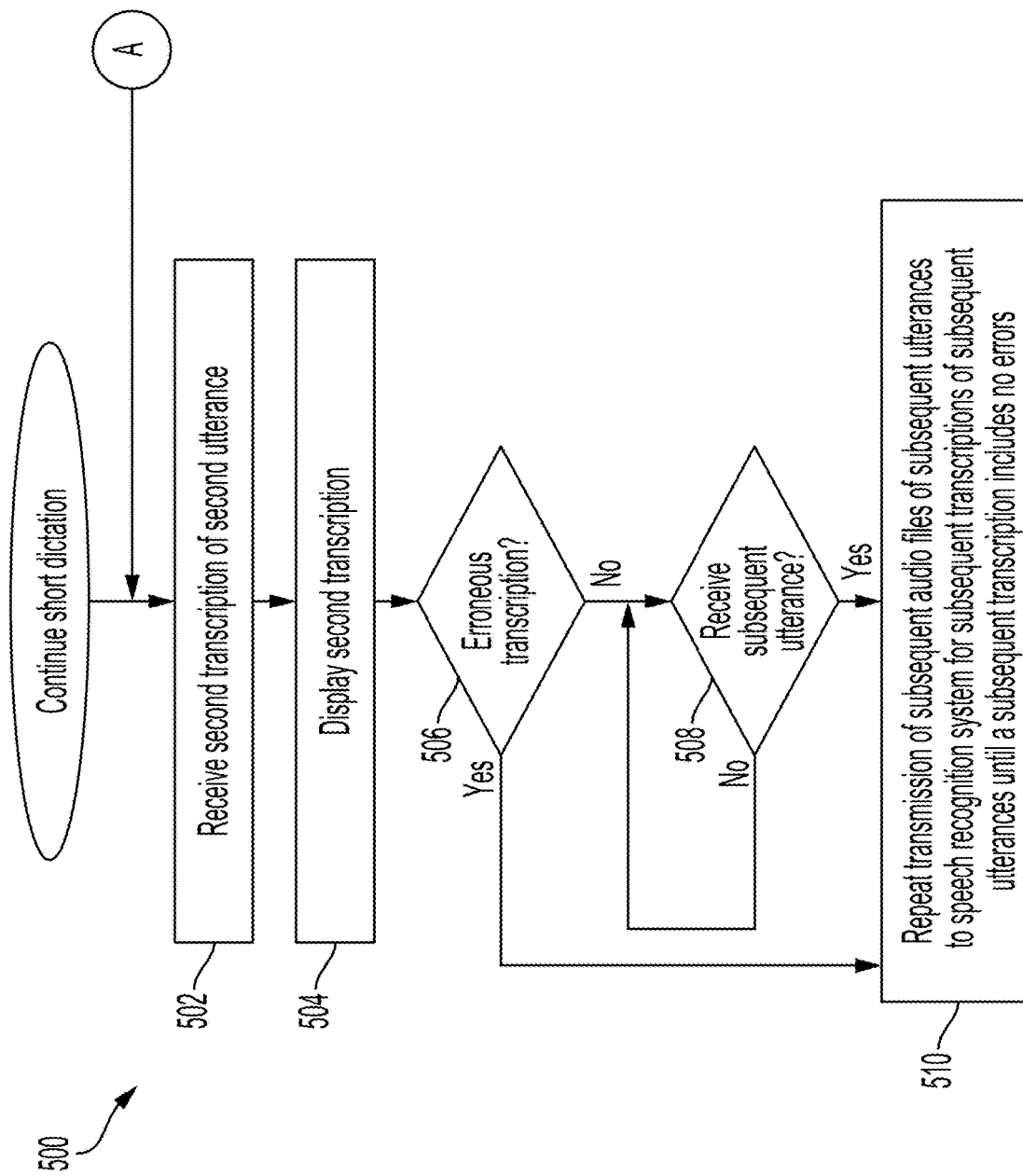

FIG. 5 shows an illustrative flowchart of a speech recognition process, in accordance with some embodiments of the disclosure. In FIG. 5, a process 500 may be performed by a speech recognition device, such as, without limitation, device 102 of FIG. 1 or device 202 of FIG. 2. In some embodiments, the steps of process 500 may be performed by computing device 800 of FIG. 8. For example, processing circuitry 840 may execute program code stored in storage 838 to carry out the steps of process 500.

In process 500, process 400 of FIG. 4 continues, and at step 502, device 102, for example, receives a second transcription of the second utterance. For example, device 102 may receive the second transcription of utterance 128 at input circuitry 850 of computing device 800 from processor 124 of communication network 108. At step 504, device 102 may display the received second transcription on device display 118. In response to an indication of a faulty second transcription, for example, by virtue of user screen highlight of an erroneous transcribed word, as decided at step 506 in FIG. 5, process 500 proceeds to step 510. At step 510, an audio file (e.g., audio file 116) with audio signals reflecting the utterance and related information are transmitted to a remote system (e.g., server 124) for further processing and receipt of a corresponding transcription text file is awaited for displaying on display 118 of device 102. Otherwise, if no erroneous transcription is found at step 506, process 500 proceeds to step 508 and may await receipt of a subsequent utterance. In some embodiments, at step 506, in response to an erroneous transcription finding, device 102 activates an audio receiver to listen for a repeat of the utterance with the faulty transcription.

Figure 6:
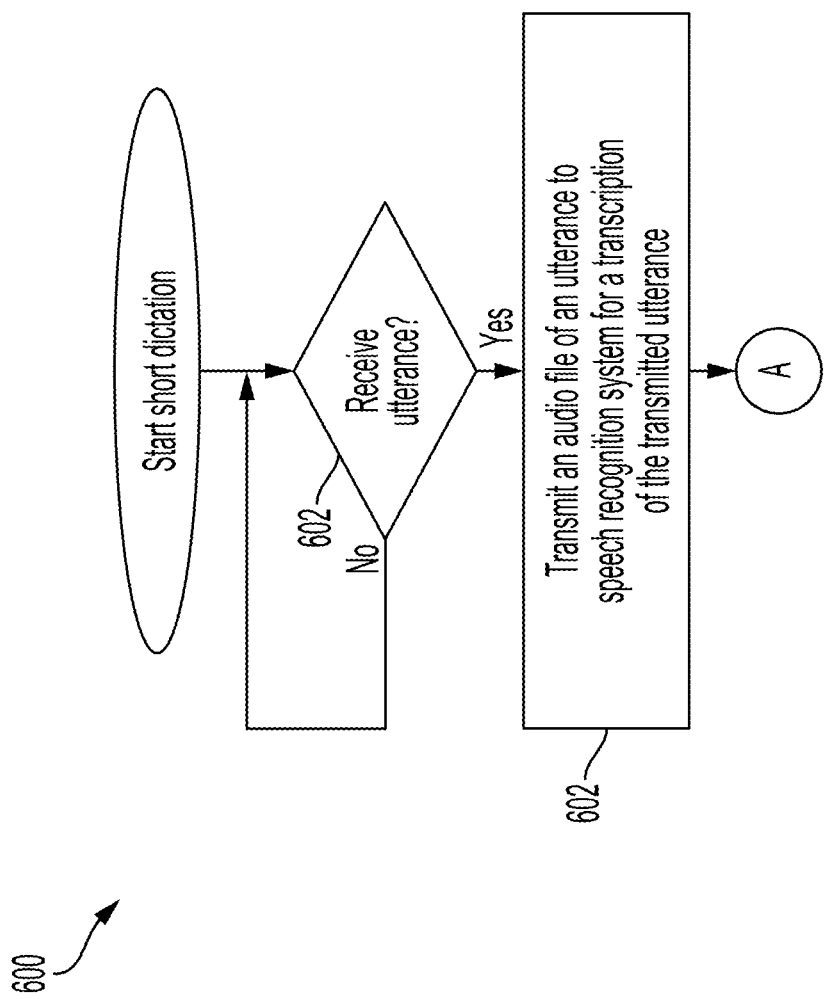

FIG. 6 shows an illustrative flowchart of a speech recognition process, in accordance with some embodiments of the disclosure. In FIG. 6, a process 600 may be performed by a speech recognition device, such as, without limitation, device 102 of FIG. 1 or device 202 of FIG. 2. In some embodiments, the steps of process 600 may be performed by computing device 818 of FIG. 8. For example, processing circuitry 840 may execute program code stored in storage 838 to carry out the steps of process 600. The steps of process 600 may be performed prior to expecting to receive a transcript of an utterance from a remote service. For example, the steps of process 600 may be performed prior to step 502 of process 500. At step 602, device 102 waits to receive an utterance, for example, utterance 126 and at step 602. Device 102 may transmit an audio file of the utterance received at step 602 to a speech recognition system, for example, processor 124 requesting transcription of the utterance, and resume at step 502 of process 500 thereafter.

Processes 400-600 are discussed above primarily with respect to device 102. It is understood that processes 400-600 may be performed by device 202 of FIG. 2.

Figure 7:
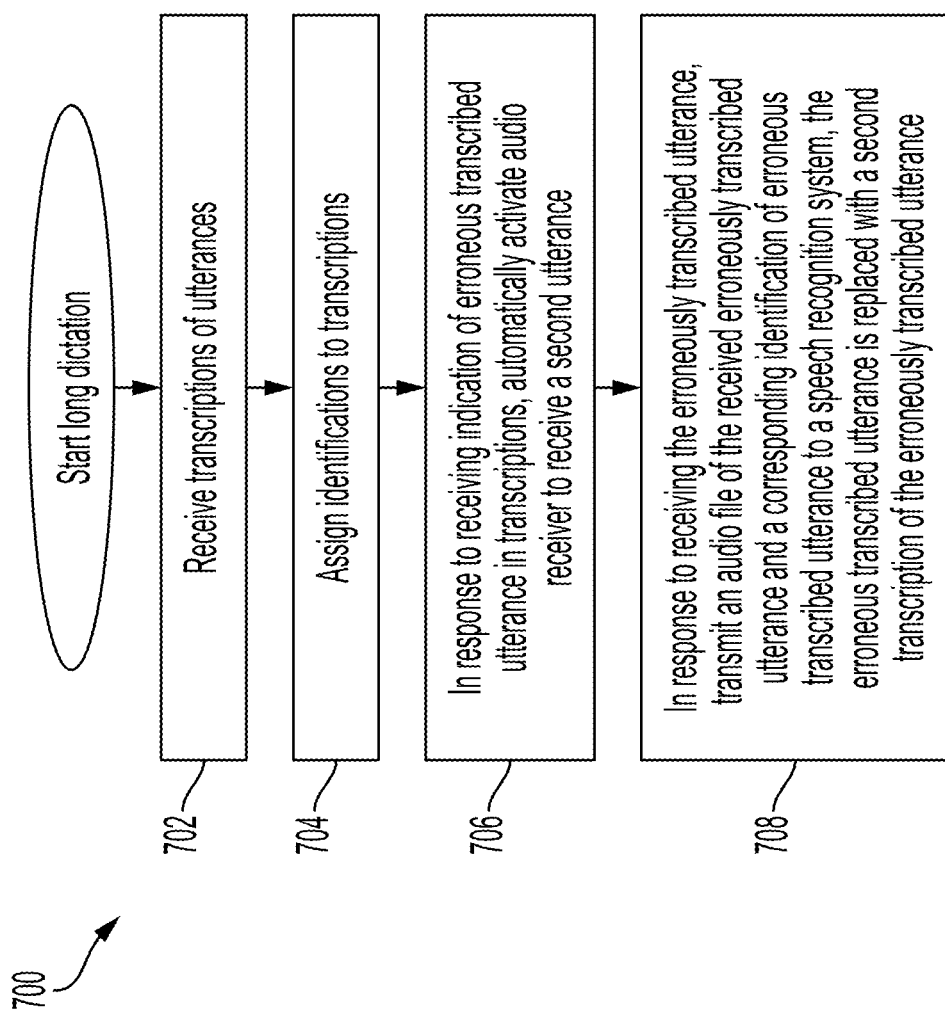

FIG. 7 shows an illustrative flowchart of a speech recognition process, in accordance with some embodiments of the disclosure. In FIG. 7, a process 700 may be performed by a speech recognition device, such as, without limitation, device 302 of FIG. 3 for transcription of a long dictation. In some embodiments, the steps of process 700 may be performed by computing device 818 of FIG. 8. For example, processing circuitry 840 may execute program code stored in storage 838 to carry out the steps of process 700.

At step 702, device 302 receives transcriptions of utterances 326 and subsequently, at step 704, device 302 assigns identifications to the received utterance transcriptions. It is understood that device 302 may itself generate transcripts of utterances 326 at step 702. In embodiments where device 302 receives transcriptions at step 702, device 302 may receive the transcriptions from a remote processor, such as processor 324 of FIG. 3. At step 704, in some embodiments, device 302 assigns a uniquely identifying number of character designation to a transcription of a corresponding utterance of utterances 326, as previously discussed.

Next, process 700 proceeds to step 706 and, in response to receiving an indication of one or more erroneous transcribed utterances, device 302 activates an audio receiver, for example, receiver 320 of FIG. 3, to listen for a repetition of a portion of a document, for example, corresponding to one or more of erroneously transcribed utterances 326, a second set of utterances (e.g., utterances 328). Alternatively, device 302 may wait for the entire set of utterances 326 rather than the corresponding faulty transcriptions of the utterances, to be received.

At step 708, in response to receiving the second set of utterances or the erroneously transcribed utterance, for example utterance 328 of FIG. 3, device 302 transmits an audio file with the utterance requiring re-transcription and a corresponding identification to designate the wrongly transcribed utterance among the set of utterances, to a remote service for enhanced transcription, such as processor 324. When processor 324 transmits a text file of the second transcription of the identified utterance, device 302 replaces the erroneous utterance in the first transcription with the second transcription, at a location in the utterances that is common to both. Device 302 may display the second transcription on device display 318 or may provide the transcribed utterance in another manner, for example, transmit the transcription in a file. In some embodiments, device 302 receives user input and a text file from processor 324 via input circuitry 850 of computing device 818 (FIG. 8) and transmits audio file 316 to processor 324 via output circuitry 852 of computing device 818.

After step 708, process 700 may proceed to process subsequent utterances and make corresponding transcription predictions in a manner consistent with the processes of FIGS. 5-6 relative to short dictation to effect further speech recognition processing measures for long dictation.

The order of steps of each of the processes 400-700, as shown in the flowcharts of FIGS. 4-7, respectively, may be suitably changed or exchanged. One or more steps, as may be suitable, can be added to or deleted from each of the processes 400-700.

A user may access, process, transmit and receive utterances and audio signals, in addition to other features, for example to carry out the functions and implementations shown and described herein, with one or more user devices (i.e., user equipment) such as the generalized embodiments of an illustrative user device. FIG. 8 is a block diagram of illustrative system 800 for transmitting messages, in accordance with some embodiments of the present disclosure. In system 800, there may be more than one of each type of user device, but only one of each is shown in FIG. 8 to avoid overcomplicating the drawing. In addition, each user may utilize more than one type of user device and more than one of each type of user device.

In some embodiments, server 802 is, in part or in whole, incorporated in communication network 814. In some embodiments, ASR 844 is, in part or in whole, incorporated in communication network 814. In some embodiments, server 802 and ASR services 844 are one and the same. For example, server 802 and ASR services 844 may represent the entirety of processors 124, 224, or 324 of FIGS. 1, 2, and 3.

In some embodiments, computing device 800 may be configured, in whole or in part, as a computing device. In some embodiments, computing device 800 may include any user electronic device that performs speech recognition operations as disclosed herein. In some embodiments, user device 800 may incorporate, in part or in whole, or is communicatively coupled to, each of user devices 102, 202 and 302 of FIGS. 1, 2, and 3, respectively. As referred to herein, the phrase "user equipment device," "user equipment," "user device," "electronic device," "electronic equipment," "media equipment device," or "media device" should be understood to mean any device for processing the text string described above or accessing content, such as, without limitation, a desktop computer, a tablet, a laptop, a remote server, any other suitable device, or any combination thereof, for speech detection and recognition processing, as described above, or accessing content, such as, without limitation, wearable devices with projected image reflection capability, such as a head-mounted display (HMD) (e.g., optical head-mounted display (OHMD)); electronic devices with computer vision features, such as augmented reality (AR); virtual reality (VR); extended reality (XR); or mixed reality (MR); portable hub computing packs; a television; a Smart TV; a set-top box; an integrated receiver decoder (IRD) for handling satellite television; a digital storage device; a digital media receiver (DMR); a digital media adapter (DMA); a streaming media device, a DVD player; a DVD recorder; a connected DVD; a local media server; a BLU-RAY player; a BLU-RAY recorder; a personal computer (PC); a laptop computer; a tablet computer; a WebTV box; a personal computer television (PC/TV); a PC media server; a PC media center; a handheld computer; a stationary telephone; a personal digital assistant (PDA); a mobile telephone; a portable video player; a portable music player; a portable gaming machine; a smartphone; or any other television equipment; computing equipment; or wireless device; and/or combination of the same. In some embodiments, the user device may have a front-facing screen and a rear-facing screen, multiple front screens, or multiple angled screens. In some embodiments, the user device may have a front-facing camera and/or a rear-facing camera. On these user devices, users may be able to navigate among and locate the same content available through a television. Consequently, a user interface in accordance with the present disclosure may be available on these devices, as well. The user interface may be for content available only through a television, for content available only through one or more of other types of user devices, or for content both available through a television and one or more of the other types of user devices. The user interfaces described herein may be provided as online applications (i.e., provided on a website), or as stand-alone applications or clients on user equipment devices. Various devices and platforms that may implement the present disclosure are described in more detail below.

Computing device 800 is shown to generally include control circuitry 828, hardware interface 842, speaker 832, display 834, and computing device interface 836. In some embodiments, display 834 is configured as or analogous to device display 116 or 316 of FIGS. 1 and 3, respectively. Control circuitry 828 is shown to include storage 838 and processing circuitry 840. Computing device interface 836 is shown to include input circuitry 850 and output circuitry 852. It is understood that computing device 800 may include additional or fewer components than that which are shown in FIG. 8.

In some embodiments, display 834 may include a touchscreen, a television display or a computer display. In a practical example, display 834 may display transcribed phrases from user utterances, as processed by devices 102, 202, and 302. Display 834 may optionally show text results received from an ASR service, for example from processors 124, 224, or 324 of FIGS. 1, 2, and 3, respectively.

In some embodiments, computing device 800 is part of a system along with a server 802 and a communication network 814. It is understood that while a single instance of a component may be shown and described relative to FIG. 8, additional instances of the component may be employed. For example, server 802 may include, or may be incorporated in, more than one server. Similarly, communication network 814 may include, or may be incorporated in, more than one communication network. Server 802 is shown communicatively coupled to computing device 800 through communication network 814. While not shown in FIG. 8, server 802 may be directly communicatively coupled to computing device 800, for example, in a system absent or bypassing communication network 814.

Communication network 814 may comprise one or more network systems, such as, without limitation, an Internet, LAN, WIFI or other network systems suitable for audio processing applications. In some embodiments, the system of FIG. 8 excludes server 802, and functionality that would otherwise be implemented by server 802 is instead implemented by other components of the system, such as one or more components of communication network 814. In still other embodiments, server 802 works in conjunction with one or more components of communication network 814 to implement certain functionality described herein in a distributed or cooperative manner. Similarly, in some embodiments, the system may exclude computing device 800, and functionality that would otherwise be implemented by computing device 800 is instead implemented by other components of the system, such as one or more components of communication network 800 or server 802 or a combination thereof. In still other embodiments, computing device 800 works in conjunction with one or more components of communication network 814 or server 802 to implement certain functionality described herein in a distributed or cooperative manner.

In some embodiments, computing device 800 or control circuitry 828 may be configured as devices 102, 202, or 302 of FIGS. 1, 2, and 3, respectively.

Server 802 includes control circuitry 820 comprising processing circuitry 826 and storage 824. Each of storages 824 and 838 may be an electronic storage device.

Each storage 824, 838 may be used to store various types of content, metadata, and or other types of data. Non-volatile memory may also be used (e.g., to launch a boot-up routine and other instructions). Cloud-based storage may be used to supplement storages 824, 838 or instead of storages 824, 838. In some embodiments, control circuitry 820 and/or 828 executes instructions for an application stored in memory (e.g., storage 824 and/or storage 838). Specifically, control circuitry 820 and/or 828 may be instructed by the application to perform the functions discussed herein. In some implementations, any action performed by control circuitry 820 and/or 828 may be based on instructions received from the application. For example, the application may be implemented as software or a set of executable instructions that may be stored in storage 824 and/or 838 and executed by control circuitry 820 and/or 828. In some embodiments, the application may be a client/server application where only a client application resides on computing device 800, and a server application resides on server 802.

The application may be implemented using any suitable architecture. For example, it may be a stand-alone application wholly implemented on computing device 800. In such an approach, instructions for the application are stored locally (e.g., in storage 838), and data for use by the application is downloaded on a periodic basis (e.g., from an out-of-band feed, from an Internet resource, or using another suitable approach). Control circuitry 828 may retrieve instructions for the application from storage 838 and process the instructions to perform the functionality described herein. Based on the processed instructions, control circuitry 828 may, for example, perform processes 400-700 in response to input received from input circuitry 850 or from communication network 814. For example, in response to receiving a voice input (an utterance), text file and/or text string, control circuitry 828 may perform the steps of processes 400-700 or processes relative to various embodiments, such as the example of FIGS. 1-3.

In client/server-based embodiments, control circuitry 828 may include communication circuitry suitable for communicating with an application server (e.g., server 802) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 814). In another example of a client/server-based application, control circuitry 828 runs a web browser that interprets web pages provided by a remote server (e.g., server 802). For example, the remote server may store the instructions for the application in a storage device. The remote server may process the stored instructions using circuitry (e.g., control circuitry 828) and/or generate displays. Computing device 800 may receive the displays generated by the remote server and may display the content of the displays locally via display 834. This way, the processing of the instructions is performed remotely (e.g., by server 802) while the resulting displays, such as the display windows described elsewhere herein, are provided locally on computing device 800. Computing device 800 may receive inputs from the user via input circuitry 850 and transmit those inputs to the remote server for processing and generating the corresponding displays. Alternatively, computing device 800 may receive inputs from the user via input circuitry 850 and process and display the received inputs locally, by control circuitry 828 and display 834, respectively.

Server 802 and computing device 800 may transmit and receive content and data such as audio data in audio files and text files via communication network 814. For example, server 802 may be configured as a speech recognition processor, and computing device 800 may be configured as a speech recognition device to transmit audio files to and receive text files from server 802, such as shown and discussed relative to FIGS. 1-3. Control circuitry 820 may send and receive commands, requests, and other suitable data through communication network 814 using server interface 822. In some embodiments, server 802 is configured, in part or in whole, as speech recognition processor 124, 224, or 324 of FIGS. 1, 2, and 3, respectively. Control circuitry 820, 828 may communicate directly with each other using interfaces 822, 836, respectively, avoiding communication network 814.

In some embodiments, processing circuitry 840, control circuitry 828, or a combination thereof, may implement one or more of the processes of FIGS. 4-7. In some embodiments, the processing circuitry, control circuitry, or a combination thereof, may implement one or more functions or components of the devices of FIGS. 1-3, such as devices 102, 202, and 302.

Control circuitry 820 and/or 828 may be based on any suitable processing circuitry such as processing circuitry 826 and/or 840, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitry 820 and/or control circuitry 828 are configured to implement a speech processing system, such as systems 100, 200, or 300 of FIGS. 1, 2, 3, respectively, or parts thereof, that perform various speech-to-text processing, audio file transmission, display functions, text file reception and operation processes described and shown in connection with FIGS. 1-7.

Computing device 800 receives a user input at input circuitry 850. For example, computing device 800 may receive text data and user input, as previously discussed. Computing device 800 transmits data through output circuitry 852. For example, computing device 800 may transmit audio data through output circuitry 852. In some embodiments, computing device 800 is a user device (or player) configured as devices 102, 202, or 304 of FIGS. 1, 2, and 3, respectively, with the capability to receive voice, text, or a combination thereof. It is understood that computing device 800 is not limited to the embodiments and methods shown and described herein.

In some embodiments, input circuitry 850 and output circuitry 852 may each be a device, such as the devices of FIGS. 1-3. In some embodiments, input circuitry 850 and output circuitry 852 may be a receiver, such as the receivers of FIGS. 1-3. Transmission of a user input or utterance to computing device 800 may be accomplished using a wired connection, such as an audio cable, USB cable, ethernet cable or the like attached to a corresponding input port at local device 300, or may be accomplished using a wireless connection, such as Bluetooth, WIFI, WiMAX, GSM, UTMS, CDMA, TDMA, 3G, 4G, 5G, Li-Fi, LTE, or any other suitable wireless transmission protocol. Transmission of data, for example in the form of audio or text, may be accomplished through output circuitry 852 to communication network 814, server 802, or ASR services 844 using a wired connection, such as an audio cable, USB cable, ethernet cable or the like attached to a corresponding input port at local device 300, or may be accomplished using a wireless connection, such as Bluetooth, WIFI, WiMAX, GSM, UTMS, CDMA, TDMA, 3G, 4G, 5G, Li-Fi, LTE, or any other suitable wireless transmission protocol.

Processing circuitry 840 may receive input from input circuitry 850. Processing circuitry 840 may convert or translate the received user input, which may be in the form of a screen highlighted word or a text string, from a text to digital signals. In some embodiments, input circuitry 850 performs the translation to digital signals. In some embodiments, processing circuitry 840 (or processing circuitry 826, as the case may be) carry out disclosed processes and methods. For example, processing circuitry 840 or processing circuitry 826 may perform processes 400-700 of FIGS. 4, 5, 6, and 7, respectively.

In some embodiments, display 834 is caused by generation of a display by devices 102, 202, and 302 of FIGS. 1, 2 and 3, respectively, or user devices coupled to devices 102, 202, and 302. A user or processor, such as processors 124, 224, and 324 (of FIGS. 1, 2, and 3, respectively) may send instructions to control circuitry 828 using input circuitry 850. Input circuitry 850, display 834, or both may include a touchscreen configured to provide a display and receive haptic input. For example, the touchscreen may be configured to receive haptic input from a finger, a stylus, or both. In some embodiments, computing device 800 may include a front-facing screen and a rear-facing screen, multiple front screens, or multiple angled screens. In some embodiments, input circuitry 850 includes a remote-control device having one or more microphones, buttons, keypads, any other components configured to receive user input, or combinations thereof. For example, input circuitry 850 may include a handheld remote-control device having an alphanumeric keypad and option buttons.

Speaker 832 may be provided as integrated with other elements of user device 800 or may be a stand-alone unit. The audio component of videos and other content displayed on display 834 may be played through speaker 832. In some embodiments, the audio may be distributed to a receiver (not shown), which processes and outputs the audio via speaker 832. In some embodiments, for example, control circuitry 828 is configured to provide audio cues to a user, or other audio feedback to a user, using speaker 832. While not shown, computing device 800 may include an audio receiver, such as receivers 120, 220, or 320 of FIGS. 1, 2, 3, respectively. In some embodiments, the audio receiver of computing device 800 may be a microphone configured to receive audio input such as voice utterances or speech. For example, a user may speak letters or words that are received by the microphone and converted to text by control circuitry 828. In a further example, a user may voice commands that are received by the microphone and recognized by control circuitry 828.

An application may be implemented using any suitable architecture. For example, a stand-alone application may be wholly implemented on computing device 800. In some such embodiments, instructions for the application are stored locally (e.g., in storage 838), and data for use by the application is downloaded on a periodic basis (e.g., from an out-of-band feed, from an Internet resource, or using another suitable approach). Control circuitry 828 may retrieve instructions of the application from storage 838 and process the instructions to generate any of the displays discussed herein. Based on the processed instructions, control circuitry 828 may determine what action to perform when input is received from input circuitry 850. For example, a screen highlighted word by detection of a double-click on a displayed word may be indicated by the processed instructions when input circuitry 850 indicates that a word was selected. An application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or it may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method of processing speech transcription in a speech processing system, the method comprising:
   receiving a first transcription of a first utterance;
   at a control circuitry, in response to receiving an indication of an erroneous transcribed word in the first transcription, automatically activating an audio receiver for receiving a second utterance; and
   in response to receiving the second utterance, at an output circuit, transmitting an audio file of the second utterance and an indication of a location of the erroneous transcribed word within the first transcription to a speech recognition system for a second transcription of the second utterance, wherein the erroneous transcribed word in the first transcription is replaced with a transcribed word from the second transcription.

2. The method of claim 1, wherein the location of the erroneous transcribed word within the first transcription corresponds to a like location within the second utterance.

3. The method of claim 1, wherein the indication of the location of the erroneous transcribed word within the first transcription is a location identification of the erroneous transcribed word within the first utterance or the second utterance.

4. The method of claim 3, wherein the location identification of the erroneous transcribed word includes a start location and an end location of the erroneous transcribed word within the first transcription.

5. The method of claim 4, wherein the start location of the erroneous transcribed word is a character number of a first character in the erroneous transcribed word and the end location of the erroneous transcribed word is a last character number in the erroneous transcribed word, wherein the character number of the first character in the erroneous transcribed word and the character number of the end character in the erroneous transcribed word are relative to character numbers of all characters in the first transcription.

6. The method of claim 1, further comprising receiving the indication of the erroneous transcribed word in the first transcription at an input circuitry of a computing device.

7. The method of claim 1, wherein the indication of the erroneous transcribed word in the first transcription is a screen highlight of the erroneous transcribed word.

8. The method of claim 1, wherein transmitting an audio file of the second utterance and an identification of the erroneous transcribed word within the first transcription to a server comprises transmitting the audio file to an automated speech recognition service.

9. The method of claim 1, further comprising receiving the second utterance in response to automatically activating the audio receiver.

10. The method of claim 9, wherein automatically activating the audio receiver comprises automatically activating a microphone feature of a handheld device.

11. The method of claim 1, wherein each of the first utterance and the second utterance corresponds to a short dictation, and
wherein the short dictation is received at a handheld device.

12. A system of processing speech transcription in a speech processing system, the system comprising:
input circuitry configured to receive a first transcription of a first utterance;
a control circuitry that, in response to receiving an indication of an erroneous transcribed word in the first transcription is configured to automatically activate an audio receiver for receiving a second utterance; and
output circuitry that, in response to receiving the second utterance, is configured to transmit an audio file of the second utterance and an indication of a location of the erroneous transcribed word within the first transcription to a speech recognition system for a second transcription of the second utterance, wherein the erroneous transcribed word in the first transcription is replaced with a transcribed word from the second transcription.

13. The system of claim 12, wherein the location of the erroneous transcribed word within the first transcription corresponds to a like location within the second utterance.

14. The system of claim 12, wherein the indication of the location of the erroneous transcribed word within the first transcription is a location identification of the erroneous transcribed word within the first utterance or the second utterance.

15. The system of claim 14, wherein the location identification of the erroneous transcribed word includes a start location and an end location of the erroneous transcribed word within the first transcription.

16. The system of claim 15, wherein the start location of the erroneous transcribed word is a character number of a first character in the erroneous transcribed word and the end location of the erroneous transcribed word is a last character number in the erroneous transcribed word, wherein the character number of the first character in the erroneous transcribed word and the character number of the end character in the erroneous transcribed word are relative to character numbers of all characters in the first transcription.

17. The system of claim 12, wherein the control circuitry is configured to receive the indication of the erroneous transcribed word in the first transcription at an input circuitry of a computing device.

18. The system of claim 12, wherein the indication of the erroneous transcribed word in the first transcription is a screen highlight of the erroneous transcribed word.

19. The system of claim 12, wherein the output circuitry is further configured to transmit the audio file to an automated speech recognition service.

20. The system of claim 12, wherein the control circuitry is further configured to receive the second utterance in response to automatically activating the audio receiver.

21. The system of claim 12, wherein the control circuitry is further configured to automatically activate a microphone feature of a handheld device.

22. The system of claim 12, wherein each of the first utterance and the second utterance corresponds to a short dictation, and
wherein the short dictation is received at a handheld device.

* * * * *